(12) United States Patent
Gogolla et al.

(10) Patent No.: US 8,068,215 B2
(45) Date of Patent: Nov. 29, 2011

(54) LASER DISTANCE METER

(75) Inventors: Torsten Gogolla, Schaan (LI); Andreas Winter, Feldkirch (AT); Helmut Seifert, Serba (DE); Gero Schusser, Buergel (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 12/316,301

(22) Filed: Dec. 10, 2008

(65) Prior Publication Data

US 2009/0153834 A1 Jun. 18, 2009

(30) Foreign Application Priority Data

Dec. 12, 2007 (DE) .................. 10 2007 055 771

(51) Int. Cl.
 *G01C 3/08* (2006.01)
(52) U.S. Cl. .................. 356/4.01; 356/301; 356/5.01
(58) Field of Classification Search ......... 356/3.01–28.5
 See application file for complete search history.

(56) References Cited

U.S. PATENT DOCUMENTS

| 5,270,795 | A * | 12/1993 | Blais ........................... 356/609 |
| 5,489,984 | A * | 2/1996 | Hariharan et al. ............. 356/512 |
| 6,747,733 | B2 * | 6/2004 | Shirai et al. ..................... 356/5.1 |
| 2004/0070747 | A1 * | 4/2004 | Schmidt et al. ................ 356/5.1 |
| 2004/0075823 | A1 * | 4/2004 | Lewis et al. .................. 356/5.01 |

* cited by examiner

*Primary Examiner* — Thomas Tarcza
*Assistant Examiner* — Luke Ratcliffe
(74) *Attorney, Agent, or Firm* — Abelman, Frayne & Schwab

(57) ABSTRACT

An electro-optic laser distance meter (1, 1') has a hand-held housing (2), an electric radiation source (3) for generating a bundled light beam (4), and receiving optics (5) with a photoreceiver (7) for receiving parts of the light beam (4) that is backscattered in a reception beam bundle (9) from a measurement object (8), with the photoreceiver (7) being arranged along the reception axis (E) in the focal point (6), extending in a plane transverse to the reception axis (E), and being partially shadowed inside the reception beam bundle (9) by a polarization filter (10, 10', 10", 10''').

8 Claims, 2 Drawing Sheets

LASER DISTANCE METER

BACKGROUND OF THE INVENTION

1. Field of the Invention

The invention relates to a hand-held, electro-optical laser distance meter preferably for use in the construction trade.

2. Description of the Prior Art

A measuring accuracy in the millimeter range is needed in hand-held laser distance meters used in the construction trade for a measurable distance range of up to several hundreds meters. To this end, a bundled, usually visible, laser beam of a laser diode is sent to the surface of an object to-be-measured. The light which is backscattered and/or reflected by the latter is imaged on the active surface of a photoreceiver by receiving optics. The time of flight between transmission of the light and reception of the light is determined by the modulation of the light (pulse-shaped, sine-shaped or stochastic). Modern laser distance meters of this kind work by the pulse reflection mixing method, as it is called. The person skilled in the art is referred to German Publication DE 101 12 833 for details.

These laser distance meters must cover a large usable dynamic range because they must detect very weak measurement light pulses which are backscattered from great distances and from poor targets (e.g., black material) as well as very strong measurement light pulses which are reflected from close range and from reflective surfaces (lacquered surfaces, tile).

In a laser distance meter with a light transmitter offset relative to the receiver axis which is disclosed in German Publication DE 100 51 302, the flat photoreceiver is covered by an opaque shutter in such a way that two separate light-sensitive areas are formed.

In a laser distance meter with a light transmitter offset relative to the reception axis which is disclosed in International Publication WO 030 02 939, a portion of the flat photoreceiver is covered by an opaque shutter. The received light power of the photoreceiver is reduced, and the dynamic range is, therefore, increased because of the displacement of the image measuring light spot caused by the parallax in the near field.

As a rule, the laser diode emits linearly polarized light. In the case of ideal reflective surfaces, the received light is also linearly polarized. In the case of ideal scattering surfaces, unpolarized light is received. Depending on the reflection properties, partially reflecting surfaces produce scattering, unpolarized components as well as reflected, polarized components. In case of surfaces located at great distances, the reflected components, which are also present in seemingly purely scattering surfaces such as, e.g., concrete walls, advantageously contribute to strengthening the measurement signal. Conversely, in the case of surfaces at close range, the reflected components cause extensive interference particularly in highly reflective surfaces because they lead to an overloading of the photoreceiver.

SUMMARY OF THE INVENTION

It is the object of the present invention to increase the usable dynamic range in hand-held electro-optic laser distance meters.

This and other objects of the present invention, which will become apparent hereinafter, are achieved by providing an electro-optic laser distance meter having a hand-held housing, an electric radiation source for generating a bundled light beam, and receiving optics with a photoreceiver for receiving parts of the light beam that is backscattered in a reception beam bundle from a measurement object, which photoreceiver is arranged along the reception axis in the focal point and extends in a plane transverse to the reception axis and is partially shadowed inside the reception beam bundle by a polarization filter (formed, for example, as a foil, layer system or crystal).

Since the imaging characteristics for measurement objects in the near field differ from those of measurement objects at a greater distance which are imaged along the reception axis in the focal point, most of the light from measurement objects in the far field which impinges on the photoreceiver along the reception axis is not shadowed by the polarization filter. Conversely, in the case of nearby measurement objects which are first imaged behind the focal point, most of the light impinging on the flat photoreceiver is shadowed by the polarization filter with respect to a polarization direction. Only the component that is polarized corresponding to the polarization direction of the polarization filter, can pass and reach the photoreceiver. Since strong light signals leading to overloading are optically suppressed, the receiver can be designed so as to be substantially more sensitive so that the usable dynamic range is increased. This leads to increased range and to the possibility of measuring in proximity to reflective surfaces.

The polarization filter is advantageously opaque parallel to the polarization of the radiation source, so that the reflection at polished measurement objects, which is intensive particularly at close range in which the polarization of the light beam is maintained, is additionally suppressed and the usable dynamic range is, therefore, further increased.

In an advantageous manner, the polarization filter is arranged outside the reception axis so that only the light from measurement objects in the near field is shadowed by the polarization filter with respect to a polarization direction when the reception axis extends parallel to the transmission axis and is spaced therefrom.

The polarization filter is advantageously formed as a polarization layer which is provided directly on or in a structural component of the receiving optics and which is also advantageously provided on the receiving lens. This provides for its economical manufacturing.

The polarization filter is advantageously arranged directly on the photoreceiver so that there is a fixed orientation of the polarization filter with respect to the photoreceiver.

In an advantageous manner, the photoreceiver has a shutter which, also advantageously, is formed as a directly applied coating so that the light-sensitive receiving surface region of the photoreceiver can be additionally defined in a suitable manner.

Alternatively, the polarization filter is advantageously arranged inside the reception axis between the receiving lens and the focal point so that only the light from measurement objects in the near field is shadowed by the polarization filter with respect to a polarization direction when the reception axis is coaxial to the transmission axis.

The polarization filter is formed advantageously as a polarizing beamsplitter so that a light beam emitted from the radiation source can be coupled in coaxially to the reception axis by the polarization filter.

The novel features of the present invention, which are considered as characteristic for the invention, are set forth in the appended claims. The invention itself, however, both as to its construction and its mode of operation, together with additional advantages and objects thereof, will be best understood from the following detailed description of a preferred embodiments, when read with reference to the accompanying drawings.

DETAILED DESCRIPTION OF THE PREFERRED EMBODIMENTS

Figure 1:
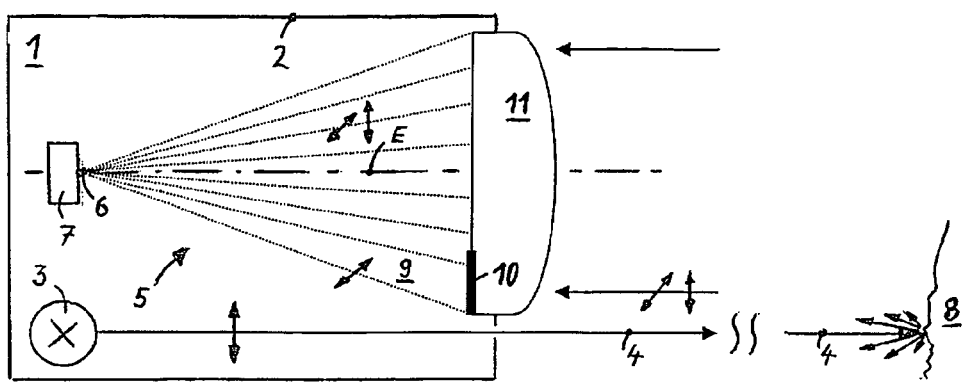
FIG. 1 a schematic view of a laser distance meter according to the present invention in the far field.

According to FIG. 1, a paraxial electro-optical laser distance meter 1 according to the present invention has a hand-held housing 2, an electric radiation source 3 in the form of a laser diode for generating a modulated, linearly polarized, bundled and visible light beam 4, and receiving optics 5 offset relative to the light beam and arranged parallel thereto. A photoreceiver 7 in form of a photodiode for receiving parts of the light beam 4 that is backscattered in a reception beam bundle 9 from a measurement object 8 is arranged along the reception axis E in the focal point 6 and extends in a plane transverse to the reception axis E. The photoreceiver 7 is partially shadowed by a polarization filter 10 inside the reception beam bundle 9 but outside the reception axis E. The polarization filter 10 passes only those components of the light which are polarized perpendicular to the polarization of the radiation source 3 and, therefore, suppresses the reflected (identically polarized) component. The polarization filter 10 is arranged directly on the receiving lens 11 in the form of a layer system. Most of the reception beam bundle 9 from the far field which impinges on the light-sensitive reception surface region of the photoreceiver 7 does not pass the polarization filter 10 so that all of the polarization components reach the photoreceiver 7.

Figure 2:
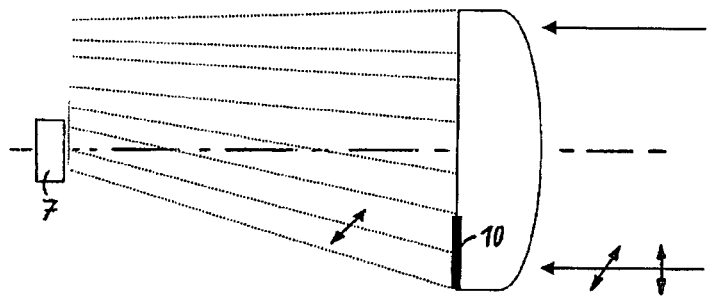
FIG. 2 a schematic view of receiving optics from FIG. 1 in the near field.

According to FIG. 2, most of the receiving beam bundle 9 from the near field, which impinges on the light-sensitive reception surface region of the photoreceiver 7 passes the polarization filter 10 so that only the polarization components which are not polarized parallel to the radiation source 3 (FIG. 1) reach the photoreceiver 7, and the component that is reflected (on surfaces with good reflective properties) is substantially suppressed.

Figure 3:
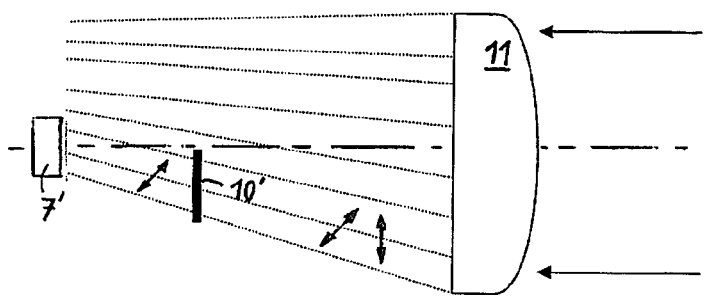
FIG. 3 a schematic view of a variant of the polarization filter of the receiving optics shown in FIG. 2.

According to FIG. 3, the polarization filter 10' is arranged between the receiving lens 11 and the photoreceiver 7 in form of a crystal.

Figure 4:
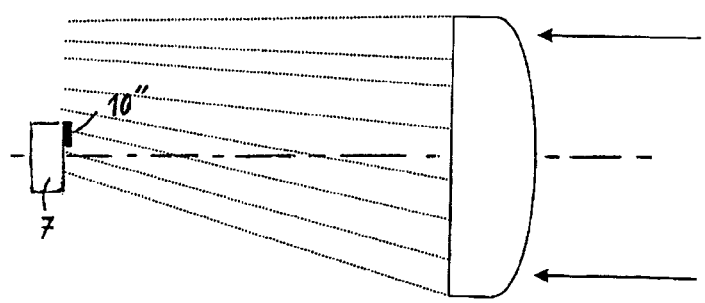
FIG. 4 a schematic view of another variant of the polarization filter of the receiving optics shown in FIG. 2.

According to FIG. 4, the polarization filter 10" in the form of a foil is arranged directly on the light-sensitive reception surface region of the photoreceiver 7.

Figure 5:
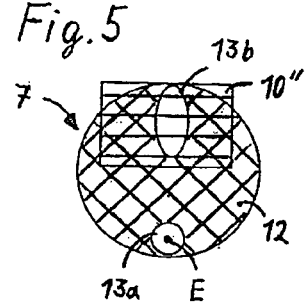
FIG. 5 a schematic view of a top view of the photoreceiver shown in FIG. 4.

According to FIG. 5, an opaque shutter 12 with two apertures 13a, 13b is arranged directly on the photoreceiver 7. These apertures 13a, 13b form two light-sensitive reception surface regions which are separate from one another. A first reception region lies on the reception axis E, and the other, second reception region is at a distance from the latter. The first reception region is acquired only by light from the far field, and the second reception region is only acquired by light from the near field. The polarization filter 10 in the form of a foil is arranged only on the second reception region.

Figure 6:
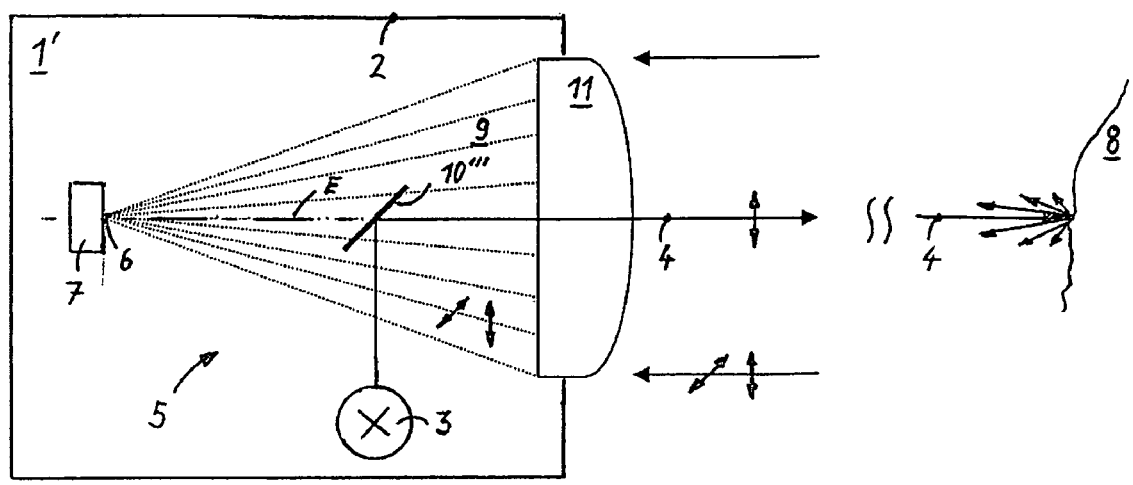
FIG. 6 a schematic view of a variant of the receiving optics in the far field.

According to FIG. 6, a coaxial electro-optic laser distance meter 1' has a hand-held housing 2, an electric radiation source 3 in form of a laser diode for generating a modulated, linearly polarized, bundled and visible light beam 4, and receiving optics 5 with a flat photoreceiver 7 in form of a photodiode for receiving parts of the light beam 4 that is backscattered in a reception beam bundle 9 from a measurement object 8. The photoreceiver 7 is arranged along the reception axis E in the focal point 6 and extends in a plane transverse to the reception axis E. The photoreceiver 7 is partially shadowed by a polarization filter 10''' coaxially inside the reception beam bundle 9. This polarization filter 10''' passes only the components of the light which are polarized perpendicular to the polarization of the radiation source 3 and, therefore, suppresses the reflected (identically polarized) component. The polarization filter 10''' is arranged in the form of a polarization beamsplitter axially between the focal point 6 and the receiving lens 11 and reflects the light beam 4 generated by the radiation source 3 oriented transverse to the reception axis E coaxially into the reception axis E.

Figure 7:
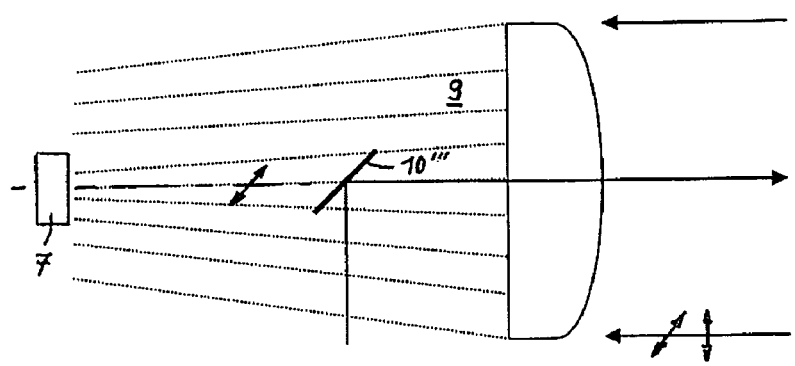
FIG. 7 a schematic view of receiving optics shown in FIG. 6 in the near field.

Conversely, according to FIG. 7, most of the reception beam bundle 9 from the near field, which impinges on the light-sensitive reception surface region of the photoreceiver 7 and which is first focused behind the focal point 6, passes the polarization filter 10''' so that only the polarization components which are not polarized parallel to the radiation source 3 (FIG. 6) reach the photoreceiver 7, and the component which is reflected (on surfaces with good reflective properties) is substantially suppressed.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A long-distance electro-optic laser for measuring distance between a measurement object and a reference point in a laser system, the laser meter comprising a hand-held housing (2); an electric radiation source (3) for generating a bundled light beam (4); receiving optics (5) including a photoreceiver (7) for receiving parts of the light beam (4) that is backscattered in a reception beam bundle (9) from the measurement object (8) along a reception axis (E), and a receiving lens (11), the photoreceiver (7) being arranged along the reception axis (E) in a focal point (6) of the receiving lens (11) and extends in a plane transverse to the reception axis (E); and a polarization filter (10, 10', 10", 10''') for suppressing at least those components of the reception beam bundle (9) which are polarized parallel to polarization of the light beam (4).

2. A laser distance meter according to claim 1, wherein the polarization filter (10, 10', 10", 10''') is opaque parallel to polarization of the radiation source (5).

3. A laser distance meter according to claim 1, wherein the polarization filter (10, 10', 10") is arranged outside of the reception axis (E).

4. A laser distance meter according to claim 1, wherein the polarization filter (10, 10', 10") formed as a polarization layer which is arranged directly at or in a structural component of the receiving optics (5).

5. A laser distance meter according to claim 1, wherein the polarization filter (10") is arranged directly on the photoreceiver (7).

6. A laser distance meter according to claim 1, wherein the photoreceiver (7) has a shutter (12).

7. A laser distance meter according to claim 1, wherein the polarization filter (10''') is arranged inside the reception axis (E) between the receiving lens (11) and the focal point (6).

8. A laser distance meter according to claim 7, wherein the polarization filter (10''') is formed as a polarizing beamsplitter.

* * * * *